(12) United States Patent
Barnard et al.

(10) Patent No.: US 9,042,729 B2
(45) Date of Patent: *May 26, 2015

(54) MINIMIZING BANDWIDTH NARROWING PENALITIES IN A WAVELENGTH SELECTIVE SWITCH OPTICAL NETWORK

(71) Applicant: VELLO SYSTEMS, INC., Menlo Park, CA (US)

(72) Inventors: Chris Wilhelm Barnard, Sunnyvale, CA (US); Piotr Myslinski, Fremont, CA (US)

(73) Assignee: TREQ LABS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/796,719

(22) Filed: Mar. 12, 2013

(65) Prior Publication Data

US 2014/0072301 A1  Mar. 13, 2014

Related U.S. Application Data

(63) Continuation of application No. 13/019,255, filed on Feb. 1, 2011, now Pat. No. 8,542,999.

(51) Int. Cl.
*H04J 14/02* (2006.01)
*H04J 14/00* (2006.01)

(52) U.S. Cl.
CPC ......... *H04J 14/0212* (2013.01); *H04J 14/0256* (2013.01); *H04J 14/0206* (2013.01); *H04J 14/0204* (2013.01); *H04J 14/0209* (2013.01); *H04J 14/0205* (2013.01)

(58) Field of Classification Search
USPC .......................................... 398/79
See application file for complete search history.

(56) References Cited

U.S. PATENT DOCUMENTS

| | | | |
|---|---|---|---|
| 6,970,613 B2 * | 11/2005 | Furukawa et al. ............... | 385/15 |
| 7,184,666 B1 * | 2/2007 | Li et al. ............................ | 398/83 |
| 7,486,896 B2 * | 2/2009 | Von Lerber .................... | 398/155 |
| 7,606,494 B1 * | 10/2009 | Weston-Dawkes et al. ..... | 398/83 |
| 8,542,999 B2 * | 9/2013 | Barnard et al. ................. | 398/79 |
| 2003/0002104 A1 * | 1/2003 | Caroli et al. .................... | 359/127 |
| 2006/0197949 A1 * | 9/2006 | Bouzid et al. .................. | 356/328 |
| 2006/0280508 A1 * | 12/2006 | Hadrich ......................... | 398/183 |
| 2007/0171397 A1 * | 7/2007 | Halldorsson et al. ......... | 356/28.5 |
| 2009/0142057 A1 * | 6/2009 | Nakano ........................... | 398/50 |
| 2009/0316286 A1 * | 12/2009 | Litvin ............................. | 359/887 |
| 2010/0129082 A1 * | 5/2010 | Zhong et al. .................... | 398/83 |
| 2012/0195592 A1 * | 8/2012 | Barnard et al. ................. | 398/48 |
| 2013/0243430 A1 * | 9/2013 | Hironishi et al. ............... | 398/48 |

* cited by examiner

*Primary Examiner* — Ken Vanderpuye
*Assistant Examiner* — Amritbir Sandhu
(74) *Attorney, Agent, or Firm* — Michael K. Bosworth; IPxLaw Group LLP

(57) ABSTRACT

This invention relates to provisioning wavelength-selective switches and reconfigurable optical add-drop multiplexers to minimize the bandwidth narrowing effect from the optical filters. Novel architectures and methods are disclosed that can significantly reduce bandwidth-narrowing on channels in a reconfigurable WDM network where a large number of optical filter elements are cascaded. Instead of blocking unused channels as in the prior art, unused channels are selectively provisioned depending on the state of their adjacent channels. Unused adjacent channels of an active channel are provisioned to follow the same path as the active channels. As each channels is deployed, the channel frequency is selected so as to minimize bandwidth narrowing.

8 Claims, 12 Drawing Sheets

| Node | Ch 193.8 | Ch 193.9 | Ch 194.0 | Ch 194.1 | Ch 194.2 |
|------|----------|----------|----------|----------|----------|
| 1    | B        | B        | PT-2     | B        | B        |
| 2    | B        | B        | PT-1     | B        | B        |
| 3    | B        | B        | PT-1     | B        | B        |
| 4    | B        | B        | PT-1     | B        | B        |
| 5    | B        | B        | BD       | B        | B        |
| 6    | B        | B        | B        | B        | B        |
| 7    | B        | B        | B        | B        | B        |

Conventional WSS Provisioning

FIG. 4

New WSS Provisioning

| Node | Ch 193.8 | Ch 193.9 | Ch 194.0 | Ch 194.1 | Ch 194.2 |
|---|---|---|---|---|---|
| 1 | B | PT-1 | PT-2 | B | B |
| 2 | B | BD | PT-1 | B | B |
| 3 | B | B | PT-1 | B | B |
| 4 | B | PT-2 | PT-1 | B | B |
| 5 | B | PT-1 | BD | B | B |
| 6 | B | PT-1 | B | B | B |
| 7 | B | PT-1 | B | B | B |

Conventional WSS Provisioning

FIG. 9

| Node | Ch 193.8 | Ch 193.9 | Ch 194.0 | Ch 194.1 | Ch 194.2 |
|------|----------|----------|----------|----------|----------|
| 1 | PTA-1 | PT-1 | PT-2 | PTA-2 | B |
| 2 | B | BD | PT-1 | PTA-1 | B |
| 3 | B | PTA-1 | PT-1 | PTA-1 | B |
| 4 | PTA-2 | PT-2 | PT-1 | PTA-1 | B |
| 5 | PTA-1 | PT-1 | BD | B | B |
| 6 | PTA-1 | PT-1 | PTA-1 | B | B |
| 7 | PTA-1 | PT-1 | PTA-1 | B | B |

New WSS Provisioning

FIG. 10

| Node | Added Channel | Adjacent Channels |
|---|---|---|
| Add Site | Set to "PT-N" | If state is "B" or "PTA-M", set to "PTA-N" |
| Intermediate Site | Set to "PT-1" | If state is "B" or "PTA-M", set to "PTA-1" |
| Drop Site | Set to "BD" | Do not change |

MINIMIZING BANDWIDTH NARROWING PENALITIES IN A WAVELENGTH SELECTIVE SWITCH OPTICAL NETWORK

CROSS REFERENCE TO RELATED APPLICATIONS

This application is a continuation of U.S. patent application Ser. No. 13/019,255, filed, Feb. 1, 2011, entitled, "Minimizing Bandwidth Narrowing Penalities in a Wavelength Selective Switch Optical Network".

I. BACKGROUND

A. Field of Art

The present invention relates to the field of wavelength division multiplexed (WDM) optical communication networks, and more particularly to the architecture and operation of wavelength selective switches (WSS) and related devices to minimize bandwidth-narrowing penalties in such networks.

B. Description of Related Art

Modern optical communication networks often employ wavelength-multiplexed optical signals in a single transmission optical fiber to increase the transmitted bandwidth. Such signals are typically deployed on a pre-defined frequency grid, such as the standard grid defined in ITU standard G.709. Each signal transmitted at one of these standard frequencies or wavelengths propagates throughout the network in its own distinct "channel" of that fiber. With such a grid, the center frequencies of adjacent channels are typically spaced at regular intervals, such as 50 GHz or 100 GHz. Alternatively, the center frequencies may be at arbitrary intervals, thereby forming an adjustable frequency grid. In these systems, a wavelength-division multiplexer is used to combine a plurality of signals onto a single transmission fiber, with the frequency of each signal having a different nominal grid frequency, and a wavelength-division demultiplexer used to separate the signals at the end of the transmission fiber so that each signal is directed to a distinct optical receiver. Each WDM signal is thereby capable of carrying separate and independent client traffic.

Optical networks may be configured in various topologies, such as point-to-point, ring, linear bus, or mesh. The topology employed in a particular network is determined by the interconnections among the nodes and available fiber in that network. WDM networks may be deployed with fixed add/drop multiplexers, colorless add and drop couplers, and/or reconfigurable optical add/drop multiplexers (ROADMS). A ROADM at a network node may be constructed using one or more wavelength-selective switches (WSS) configured to selectively add, drop, or block channels based on their grid frequency.

WSS technology is available today that supports more than 80 channels through a single device typically having from 3 to 10 input/output ports. However, the optical technology can be extended to higher channel counts and port counts. Several types of WSS optical modules have been proposed (see, e.g. U.S. Pat. Nos. 7,492,986 and 6,487,334).

Regardless of the particular technology employed, a WSS typically has the ability to selectively direct a signal from an input port to any output port based on the frequency (or wavelength) of the signal. The route or path of a signal originating at a source node of the network, and passing through one or more intermediate nodes before reaching a destination node, may be deemed to include its path within a node as well (i.e., between one or more WSS input ports and one or more WSS output ports).

A ROADM node may also have: (1) a channel monitor that monitors the power at each frequency grid point; and, (2) a means of attenuating the power of each channel transmitted in a fiber. The channel monitor and power adjustment may be integrated into the WSS module or implemented as separate modules. Regardless of the particular implementation, the combination of a channel monitor with power control enables the functions of (1) balancing the channels at one or more points in the ROADM node and (2) selectively blocking channels by maximizing their attenuation.

WSS technology, coupled with a management overhead channel, enables remote network reconfiguration from a central network operations center (NOC). The management channel can be transmitted over an external IP network, a dedicated optical service channel, or within the embedded overhead of an optical signal.

In a typical deployment, before any channels have been added to the network, all channels of the WSS are set at full attenuation, which can be referred to as the blocking state or "B" state. This prevents amplified spontaneous emission (ASE) from optical amplifiers from propagating and being amplified through the network when a particular channel is not present in the network. Circulating ASE is of particular concern in networks with a closed optical path, such as ring topologies, because of the optical power instability it can cause. In an amplified network with one or more closed paths (such as in a ring network), each grid channel is typically blocked or dropped at least once to prevent ASE instability.

If a channel is being reused, i.e. the same channel frequency is being reused by two or more non-overlapping separate signals, then the light from the first signal must be effectively blocked before the second signal is added so as to prevent cross-talk penalties. Dropped signals are not blocked in broadcast applications, however, because that same signal must propagate to the other nodes receiving the broadcast signal.

A WDM network is typically deployed with a "guardband" between the nominal frequencies. A guard band is required because: (1) practical optical filters used in WSS modules have a finite slope between their pass bands and stop bands; (2) optical signals have a modulation bandwidth on the order of their bit rate; and, (3) errors occur in laser frequencies and center frequencies in optical filters due to manufacturing tolerances, calibration errors, temperature drifts, and component aging. For example, 100 GHz channel spacing may be used for channels at 10 Gb/s or 40 Gb/s, which have full-width at half-maximum bandwidth less than 50 GHz. As optical networks have evolved, the maximum bit rate has increased, with 100 Gb/s networks currently being deployed, with a reduced grid frequency spacing of 50 GHz. Thus, the relative guard band is decreasing over time while requirements on frequency accuracy are increasing.

A significant design issue for WSS filters is the problem of bandwidth narrowing. As client signals traverse WSS modules in a network where each WSS is set to attenuate unused adjacent channels (e.g., unused channels at 193.9 THz and 194.1 THz adjacent to signal channel 194.0 THz), the effective passband of the WSS cascade is reduced, which can lead to bit errors. For an optical signal in a particular channel propagating through a WSS network, a bandwidth narrowing event occurs at each WSS where one or both of the channels adjacent to the signal are set to a different physical state (e.g., "pass through" as compared to "blocking" or "add") than the state of the channel of the given signal.

All optical filters have a useable passband which is less than that of an ideal filter due to the finite slope of a manufacturable filter passband. Moreover, the useable bandwidth of cascaded filters decreases as more filters are inserted in the signal path. This bandwidth narrowing effect has led WSS designers and manufacturers to increase the effective Gaussian order of the WSS pass band spectral shape [See for example "Wavelength-Selective Switches for ROADM Applications" in IEEE Journal of Selected Topics in Quantum Electronics, vol 16, pp. 1150-1157, 2010]. Such techniques have improved, but not eliminated, the problem of bandwidth narrowing. Therefore, as the bit rate (and hence bandwidth) of optical signals increases, and the size of ROADM networks increase, there remains a need for more effective techniques of minimizing WSS bandwidth narrowing.

Accordingly, a solution is desired that provisions channels carrying client signals in WSS modules so as to minimize bandwidth narrowing while still preventing significant ASE circulation and coherent cross-talk among different transmitters operating at the same frequencies.

II. SUMMARY

In accordance with the present invention, various embodiments of novel methods and architectures are disclosed for operating wavelength selective switch devices and/or other bandwidth narrowing devices in a wavelength division multiplexed optical network. In one embodiment, each WSS device in the network maintains a provisioned state for each WDM optical channel. As is the case with existing networks, concerns relating to ASE circulation and cross-talk warrant assigning an initial default blocking state ("B") to all channels on all ports.

At any given node, multiple client signals can be added to the network as well as dropped from the network. As noted above, one or more WSS modules at each network node can include multiple input and output ports, and permit a client signal on any input port to be routed to any one or more output ports based on its channel wavelength or frequency (where signals on each output port can propagate along one or more optical fibers following distinct routes or paths among different network nodes). Moreover, a WSS module can be configured in a filtered add configuration to selectively add client signals to the network, or in a filtered drop configuration to selectively drop client signals from the network. In each of these configurations, the WSS can also selectively attenuate each signal by a programmable amount. The inventive concepts discussed herein apply equally to all such scenarios.

For the sake of simplicity, however, we will focus herein on "degree 2" nodes in which a WSS selects among 2 input ports per channel—input port "1" representing a client signal transmitted to that node from another node, and input port "2" representing a client signal originating (i.e., being added) at that node. The WSS routes a channel to its output port (a single output port in a degree 2 node) from input port 1 or input port 2 (while blocking the same signal from the other input port), or it blocks the channels on both of its input ports (while optionally also dropping the channel from input port 1 to a receiver at the node). Again, in each of these configurations, each WSS can provide distinct attenuation to each signal.

The WSS at a given node thus maintains one of three physical states for each channel: (1) a physical "pass through" state, logically represented herein as "PT-1" in which the channel on input port 1 passes through the WSS (and the node) to another node in the network, possibly with a programmable attenuation; (2) a physical "add" state, logically represented herein as "PT-2" in which the channel on input port 2 is added to the network from this "source" node, possibly with a programmable attenuation, and propagated to another node in the network; or (3) a physical "blocking" state, logically represented herein as "B" (or "BD" for the case in which the channel is dropped at this "destination" node), which corresponds to a substantial attenuation of the signal toward the passthrough port.

In other embodiments, multiple states could be employed at a node on a given channel—e.g., utilizing multiple output ports to "pass through" a channel to one output port connected to another node via one optical fiber while "blocking" that channel on a second output port connected to a different node via a second optical fiber. In such embodiments, for example, each output port might have its own state per channel.

Until a client signal is provisioned on a given channel, the state of that channel at all nodes remains the default blocking state (logical state "B"). When a client signal is added at a node and provisioned on a particular channel, the state of that channel at that "source" node transitions to the physical "add" state, represented herein as the logical "PT-2" state, while the state of that channel at each "intermediate" node along its route transitions to the physical "pass through" state, represented herein as the logical "PT-1" state, and the state of that channel being dropped at its "destination" node transitions to the physical "blocking" state, represented herein as the logical "BD" state. Note that the logical state table representing the physical configuration of each WSS will have a separate entry for each channel at each WSS module.

It should be noted that, in one embodiment, the logical "PT-2" state takes priority over the "BD" state for this scenario in which a channel is reused. Note that, with programmable add WSS modules, the PT-2 state for a particular channel implies that the same channel is blocked on the WSS input port 1. In other words, the node is both a "source" node for a new client signal added on a particular channel, and a "destination" node for another client signal (from another node) dropped (received) on that same channel. The fact that the signal is also dropped at the node can be inferred from the "PT-2" state, as well as known via other means of communication among the nodes.

Bandwidth narrowing of a particular signal traversing a WSS occurs whenever the WSS is set to block the adjacent signal frequencies along the same path. However, if the WSS is set to direct the adjacent signal frequencies along the same path as the given signal, then bandwidth narrowing does not occur. Therefore, to address the bandwidth narrowing issue that results when client signals provisioned on any particular channel propagate through multiple WSS modules at multiple network nodes, the present invention considers the state of adjacent channels whenever a new client signal is added at a node (including the state of adjacent channels at intermediate nodes before the signal is dropped at its destination node). If either or both of those adjacent channels is unused (i.e., in a "B" state, as in the prior art), then each such unused adjacent channel is "unblocked" and transitions to a new logical state ("PTA-1" for a channel adjacent to a "PT-1" channel, and "PTA-2" for a channel adjacent to a "PT-2" channel) having the same physical state as the client signal's channel (or "signal channel") to which it is adjacent.

For example, if a new client signal is added at a node, the "B" state of any unused adjacent channel is changed to the "PTA-2" state (and to the "PTA-1" state at each intermediate node before the signal is dropped at its destination node). As a result, the unused adjacent channels have the same physical state (albeit not the same logical state) as does the signal channel. This is true at the channel's source node ("add"

state), at each intermediate node ("pass through" state) and at the channel's destination node ("blocking" state).

Although no client signal is present on these unused adjacent channels, these channels are no longer "blocked." As a result, the effective passband of each such client signal is widened throughout the cascade of WSS filters to encompass the unused adjacent channels in addition to the signal channel. This in turn reduces the number of bandwidth narrowing events along the route of the client signal, and thus reduces the probability of bit errors. Even though the unused channels are not blocked at each WSS, they are still blocked at the WSS that drops the particular signal. So, the WSS at the drop site still prevents significant ASE circulation and coherent crosstalk among different transmitters operating at the same frequencies.

In one embodiment of the present invention, the provisioning commands for a given channel are sent to each WSS over a network management channel, and the WSS sets the state of the adjacent channels accordingly. In another embodiment, the provisioning commands for the provisioned channel and adjacent channels are sent to each WSS over a network management channel. In yet another embodiment, a channel monitor is employed at each WSS to monitor the signal channels and provision the WSS to add channels when the monitored channel power reaches a minimum threshold, at which point the unused adjacent channels are also provisioned to follow the same path as the detected signal channel.

The embodiments disclosed herein apply to provisioning each WSS in multi-degree nodes architected by cascading WSS modules, and are applicable to virtually any WDM channel plan and virtually any network architecture. These techniques also permit reuse of channels for nonoverlapping signal paths (in one embodiment, via two transmitters operating at the same frequency). Moreover, an algorithm is also disclosed for selecting new channel frequencies so as to minimize bandwidth narrowing penalties.

III. BRIEF DESCRIPTION OF THE DRAWINGS

FIG. 4 is a 5-channel subsection of a table that lists the conventional configuration of each channel of every counterclockwise WSS for the network of FIG. 3.

FIG. 9 is a 5-channel subsection of a table that lists the conventional provisioning of each channel of every counterclockwise WSS for the network of FIG. 8.

FIG. 10 is a 5-channel subsection of a table that lists the novel provisioning of each channel of every counterclockwise WSS for the network of FIG. 8.

FIG. 11 is a state table that lists the novel provisioning states for each WSS in an optical network, reflecting the state changes of a channel that is added to the WSS network as well as those of the channels adjacent to the added channel.

IV. DETAILED DESCRIPTION

Embodiments of the present invention described below include architectures and methods of provisioning WSS modules in an optical network so as to minimize bandwidth narrowing effects while preventing instabilities from circulating ASE and enabling channel reuse. In these embodiments, the operation of the WSS devices is described in the context of a ring WDM optical network which supports a plurality of channels with central frequencies on a pre-defined grid of 100 GHz, such as 193.0 THz, 193.1 THz, etc. However, it will be appreciated that the particular channel spacing used in these embodiments can vary, and that even uniform channel spacing is not essential. Moreover, while these embodiments employ a "degree 2" WSS network in a ring topology, the present invention is equally applicable to more generalized topologies and higher-degree WSS nodes.

Figure 1:
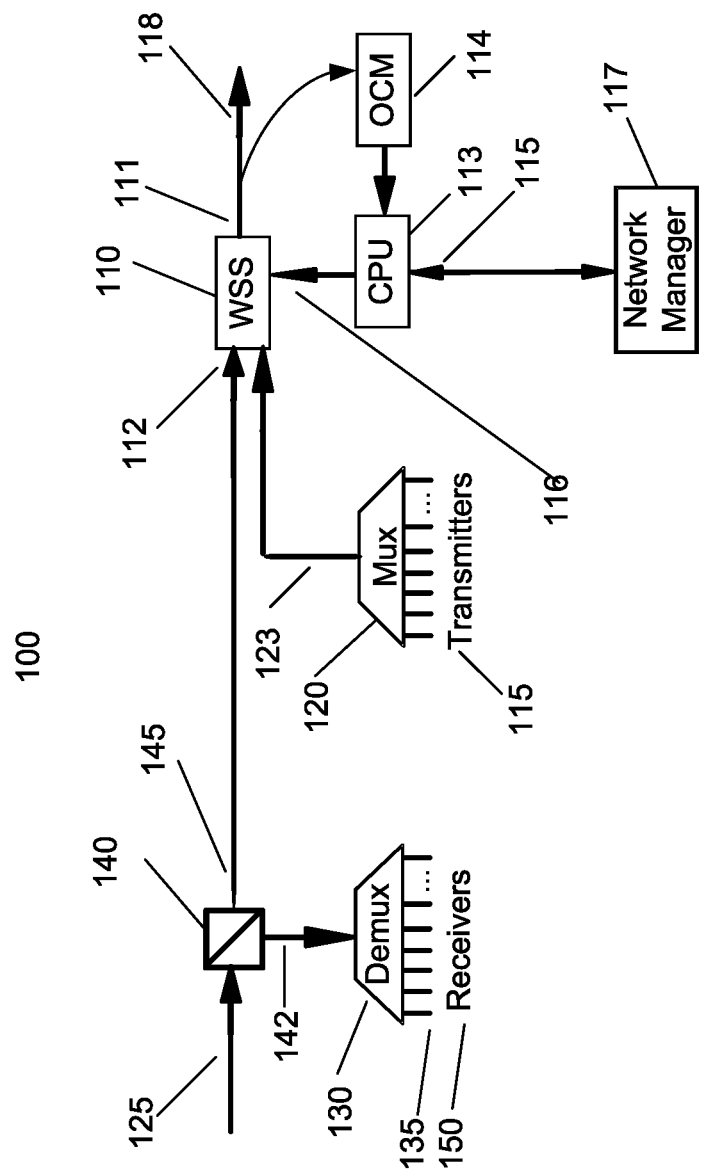
FIG. 1 is a block diagram of a degree two ROADM node with a filtered add configuration where a 2×1 WSS is configured to selectively add signals to the optical network.

FIG. 1 illustrates one embodiment of a reconfigurable optical node 100 that uses a WSS module 110 in a filtered add configuration where the WSS is positioned to add signals from an add input port 123 to the optical network, and pass or block the incoming signals from the passthrough input port 112. The WSS 110 has a control port 116 that is connected to a CPU 113 running software that sends provisioning information to the WSS in the form of a table that specifies the desired state for each optical channel. Node 100 also may include an integrated or separate channel monitor 114 that reports the power in each channel to the CPU 113. For a WSS with per-channel power control, the CPU 113 may use the reported channel powers from channel monitor 114 to adjust the target channel powers of the WSS. This per-channel power control may be used to balance the channels at the line output fiber 118. The CPU 113 can include a suitably programmed microprocessor or the like, and may receive provisioning information from a network manager 117 via its external management port 115.

Signals from transmitters 115 may be added to the network at node 100 by multiplexing them with a standard optical multiplexer 120 (e.g., wavelength specific and/or colorless) and then directing the multiplexed signals to one of the WSS ports, add input port 123 in this example. In other embodiments, WSS 110 may have more than two input ports, e.g. N+1 input ports, so that N transmitters may be directly connected to the WSS input ports. Signals entering the node from the line input fiber 125 may be dropped with a 1×2 optical coupler 140 that sends a portion of the incoming power (via output port 142) to an optical demultiplexer 130, which separates the signals based on their channel frequency. At the output ports 135 of demultiplexer 130, the received signals are connected to a plurality of optical receivers 150. the demultiplexer 130 can be wavelength specific, colorless, WSS, etc.

The other output port of optical coupler 145 is connected to WSS passthrough input port 112. Signals entering node 100 from line input fiber 125 are thereby directed to WSS 110 which selectively controls the signals based on their frequency to selectively (1) pass the signal from line input fiber 125 to line output fiber 118 (via passthrough input port 112 and WSS output port 111) and block the signal entering from add input port 123; (2) block the signal from line input fiber 125 and pass the signal, preferably with controlled attenuation, from add input port 123 to line output fiber 118 (via WSS output port 111); or (3) block the signals entering from both input ports 112 and 123. If per-channel attenuation functionality is available in the WSS devices, then the attenuation of each channel can be set such that all signal powers are set to be equal at the line output 118.

Note that the embodiment of FIG. 1 shows only one direction (Left to Right) of signal propagation with a single input line fiber and a single output line fiber. While optical networks are typically implemented with a fiber pair between nodes, we show only one direction in our examples for simplicity of illustration. Also note that an optical node may have other elements such as amplifiers, tap couplers and monitors, optical service channel taps and transceivers, dispersion compensation modules, etc. Again, for the purpose of simplification, we do not show such elements in our examples, but it is understood that they may be deployed as desired. Further note that the embodiment of FIG. 1 only shows a node of degree two, while those skilled in the art will recognize that these same concepts would be applicable to higher-degree nodes.

Figure 2:
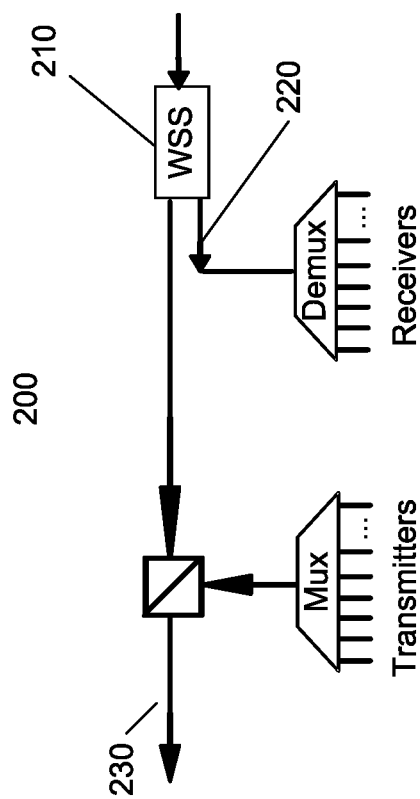
FIG. 2 is a block diagram of a degree two ROADM node with a filtered drop configuration where a 2×1 WSS is configured to selectively drop signals from the optical network.

FIG. 2 illustrates another embodiment of a ROADM node 200, in a filtered drop configuration where WSS 210 is positioned to selectively drop optical signals to one or more drop ports 220 and selectively pass through optical signals, preferably with controlled attenuation, to line output fiber 230. The concepts described herein could apply equally to ROADM node configuration 100 or 200, as well as to higher-degree ROADM nodes. For purposes of illustration, the following embodiments will refer to the embodiment shown in FIG. 1. Note also that the embodiments described herein refer to a channel plan with 100 GHz spacing, such that the 193.9 THz channel, for example, is adjacent to the 194.0 THz channel. Those skilled in the art will recognize that the concepts described herein are equally applicable to other channel spacings and other node architectures employing WSS and other optical bandwidth-narrowing devices.

Note that the embodiment of FIG. 2 shows only one direction (Right to Left) of signal propagation with a single input line fiber and a single output line fiber. While optical networks are typically implemented with a fiber pair between nodes, we show only one direction in our examples for simplicity of illustration. Also note that an optical node may have other elements such as amplifiers, tap couplers and monitors, optical service channel taps and transceivers, dispersion compensation modules, etc. Again, for the purpose of simplification, we do not show such elements in our examples, but it is understood that they may be deployed as desired. Further note that the embodiment of FIG. 2 only shows a node of degree two, while those skilled in the art will recognize that these same concepts would be applicable to higher-degree nodes.

Figure 3:
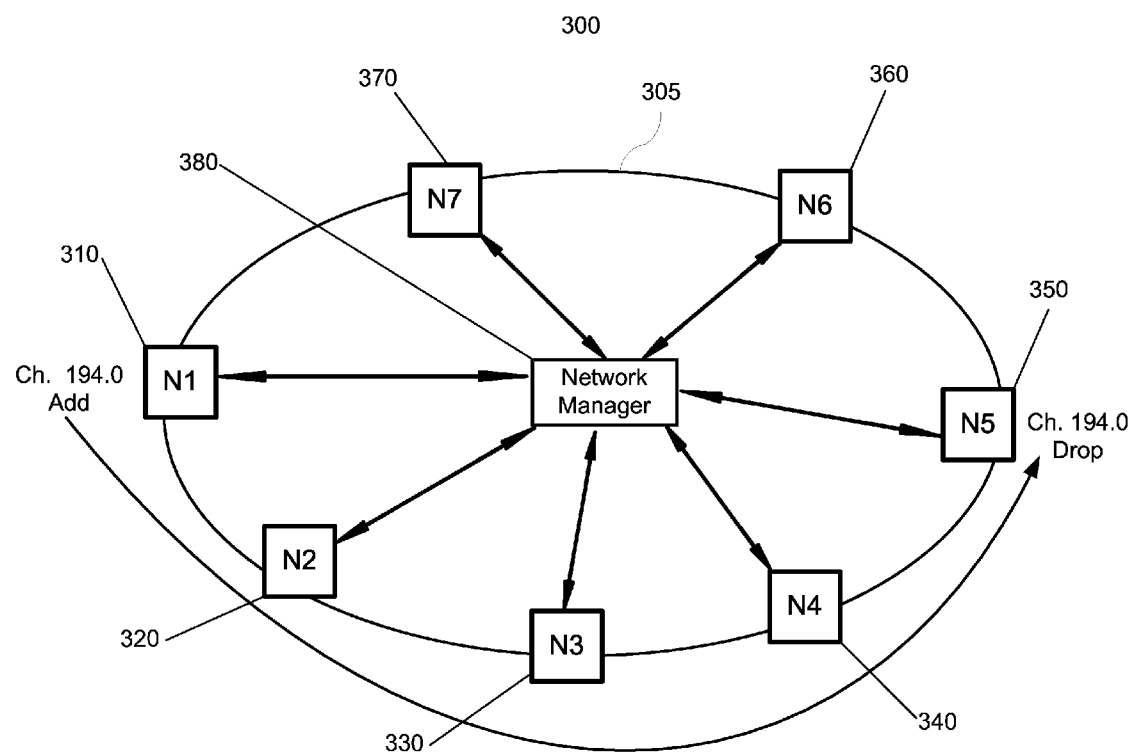
FIG. 3 illustrates an optical ring network with seven ROADM nodes selected to transmit Channel 194.0 (at frequency 194.0 THz) from Node 1 to Node 5 in the counterclockwise direction. Each ROADM node has the WSS configuration shown in FIG. 1.

FIG. 3 depicts a seven-node optical network 300 in a ring configuration with the node configuration shown in FIG. 1. Network 300 shows a single line fiber 305 transmitting signals among nodes 310, 320, 330, 340, 350, 360, and 370 in a counterclockwise direction. When no channels have been provisioned, e.g. when the network is first installed, the control software sets the WSS in each node to block all the other channels to prevent circulating noise from optical amplifiers (not shown). In this example, channel 194.0 (194.0 THz) is provisioned to be added at Node 1 310 and propagate to Node 5 350 in the counterclockwise direction. Network manager software 380 is used to monitor and provision the WSS at each node, preferably using the overhead channel mentioned above.

The WSS at Node 1 310 is configured to add channel 194.0 at its input port 2 (state "PT-2"); the WSS at the intermediate nodes 2-4 320, 330, and 340 are set to pass channel 194.0 from their first input port to the output (state "PT-1"); the WSS at Node 5 350 that is dropping channel 194.0 is set to block that channel (state "BD"); and the WSS at Nodes 6 and 7 360 and 370 block channel 194.0 at all ports ("B"). Note that we differentiate the state where a WSS is blocking a signal that is not present at its node (state "B") from the state where a node is blocking a signal that is dropped at its node (state "BD").

The Table 400 in FIG. 4 shows the conventional provisioning (prior art) of the WSS modules for the example shown in FIG. 3. Note that, for the purpose of simplicity, this table shows only a subsection of the channels (Chs. 193.8 to 194.2) in the network. As described above, column 410 of Table 400 lists the state of each WSS in the network for Channel 194.0. All other channels are blocked, denoted by the "B" state in Table 400; in particular the channels adjacent to Channel 194.0 are set to the "B" state along the path of the Channel 194.0, denoted by the shaded entries 420 in Table 400. The setting of the channels adjacent to channel 194.0 to a blocked state will cause spectral narrowing on channel 194.0 as it propagates from Node 1 to Node 5.

As shown by the shaded entries 420, Channel 194.0 will experience this spectral narrowing at 4 edges on its lower frequency edge from the blocked Channel 193.9 at Nodes 1-4, and at 4 edges on its higher frequency edge from the blocked Channel 194.1 at Nodes 1-4. These 8 bandwidth narrowing events are represented by the differences in physical states between the signal channel (Channel 194.0) and its unused adjacent channels (Channels 193.9 and 194.1). For example, Channels 193.9 and 194.1 are in the "blocking" state at Nodes 1-4, whereas Channel 194.0 is in the "add" state at Node 1 and in the "pass through" state at Nodes 2-4. Note that, despite the difference in logical states at "destination" Node 5, Channel 194.0 ("BD") is in the same physical "blocking" state ("B") as are Channels 193.9 and 194.1, indicating the lack of a bandwidth narrowing event. Thus, this prior art configuration, with a cascade of 5 ROADMs, results in significant bandwidth narrowing.

Figure 5:
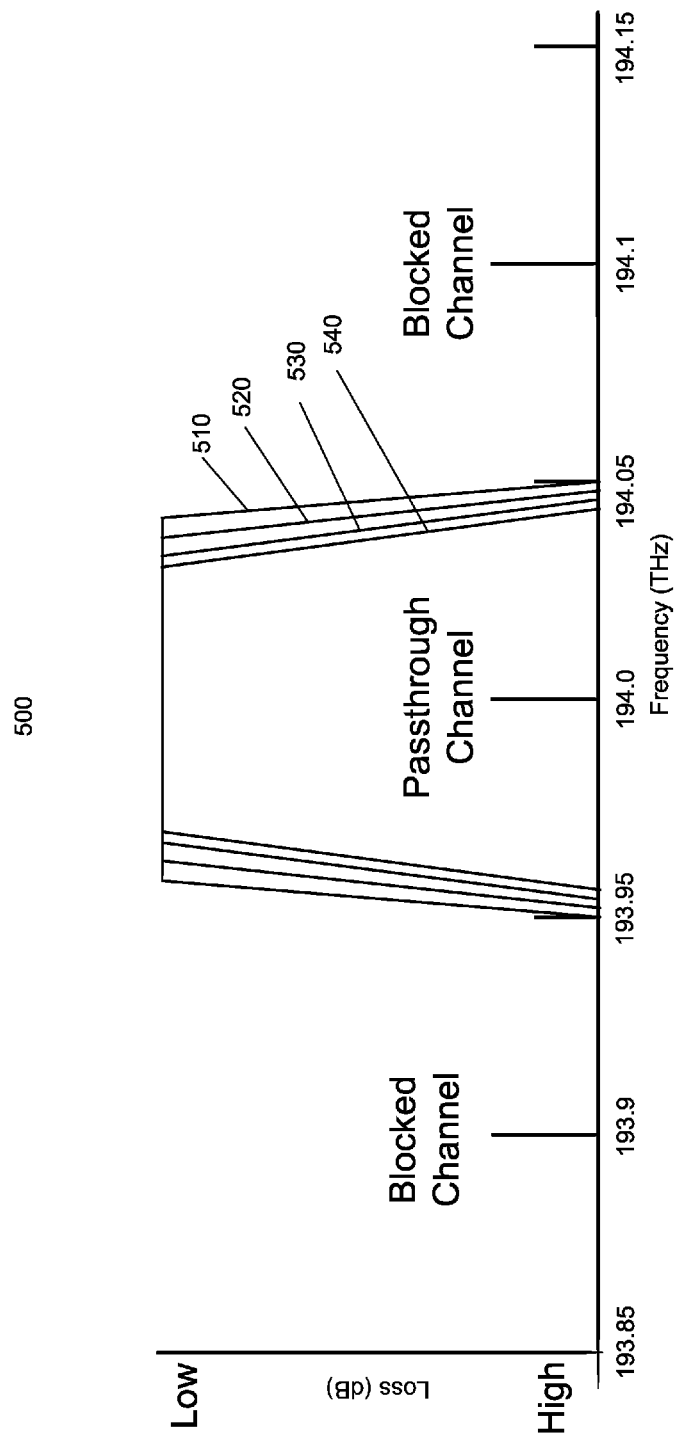
FIG. 5 is a graph illustrating the bandwidth narrowing effects for the provisioning example in FIG. 4.

Graph 500 in FIG. 5 illustrates the spectral narrowing experienced by the channel 194.0 passband as it propagates through each WSS with the provisioning illustrated in FIG. 4. Since the adjacent channels at 193.9 THz and 194.1 THz are blocked, the passband of a single WSS has the loss curve 510. Loss curves for two WSS modules 520, three WSS modules 530, and four WSS modules 540 show that the passband of the 194.0 THz channel is further narrowed as it passes through each WSS module while propagating from Node 1 to Node 4 with the conventional provisioning shown in table 400 of FIG. 4. This spectral narrowing through a cascade of WSS modules with conventional provisioning is well known to those skilled in the art.

Figure 6:
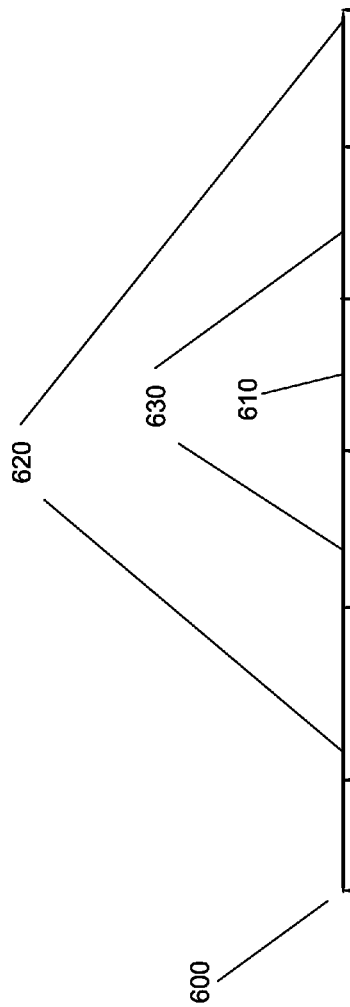
FIG. 6 is a 5-channel subsection of a table that lists the novel configuration of each channel of every counterclockwise WSS for the network of FIG. 3.

Table 600 in FIG. 6 illustrates a novel method of provisioning the WSS modules for the example shown in FIG. 3. Column 610 of Table 600 lists the state of each WSS in the network for Channel 194.0. Note that these are the same states as listed in column 410 of Table 400. Channels that are not adjacent to Channel 194.0, such as 193.8 and 194.2, remain blocked as shown in columns 620. However, channels that are adjacent to the provisioned Channel 194.0 are provisioned differently from the conventional method shown in Table 400.

In the example illustrated in FIG. 6, each WSS sets the adjacent channels to the same physical state as the provisioned channel ("add" in Node 1, and "pass through" in Nodes 2-4), as shown in columns 630. This may include setting the adjacent channels' attenuation to the same attenuation as that for the provisioned channel. Even though no client signals are present on adjacent channels 193.9 and 194.1 (only on Channel 194.0), the WSS at Node 1 is configured to add the adjacent channels at its input port 2 (state "PTA-2"); the WSS at intermediate nodes 2-4 are set to "pass through" the adjacent channels from their first input port to the output (state "PTA-1"); and the WSS at Node 5 that is dropping the 194.0 client signal is set to block the adjacent channels (state "B"); and the WSS at Nodes 6 and 7 continue to block the adjacent channels at all ports (state "B").

Note, as will be explained in greater detail below, that we differentiate the state where a WSS is passing a provisioned signal from port N (state "PT-N") from the state where a WSS is set to pass a channel from port N that is adjacent to a signal channel (state "PTA-N"). Also note that the node passthrough path of the adjacent channels is still blocked at at least one node (Nodes 5, 6, 7 and 1 in this case), so that recirculating ASE will not occur at the adjacent channels.

Since the unused adjacent channels of the signal in channel 194.0 are set to propagate along the same path as the signal, the signal does not experience any spectral narrowing as it propagates through the WSS modules. This is reflected in the fact that, despite the difference in logical states, the physical states of adjacent Channels 193.9 and 194.1 are the same as those of signal Channel 194.0 ("add" in Node 1, and "pass through" in Nodes 2-4).

Spectral filtering at the edge of the signal channel only occurs at the add multiplexer (element 120 in FIG. 1) and the drop demultiplexer (element 130 in FIG. 1). In this example, the number of WSS bandwidth narrowing occurrences has been reduced from eight (2 edges at each of four locations—Nodes 1-4) to zero. In larger networks with more nodes, this reduction of spectral narrowing can be even more significant.

Figure 7:
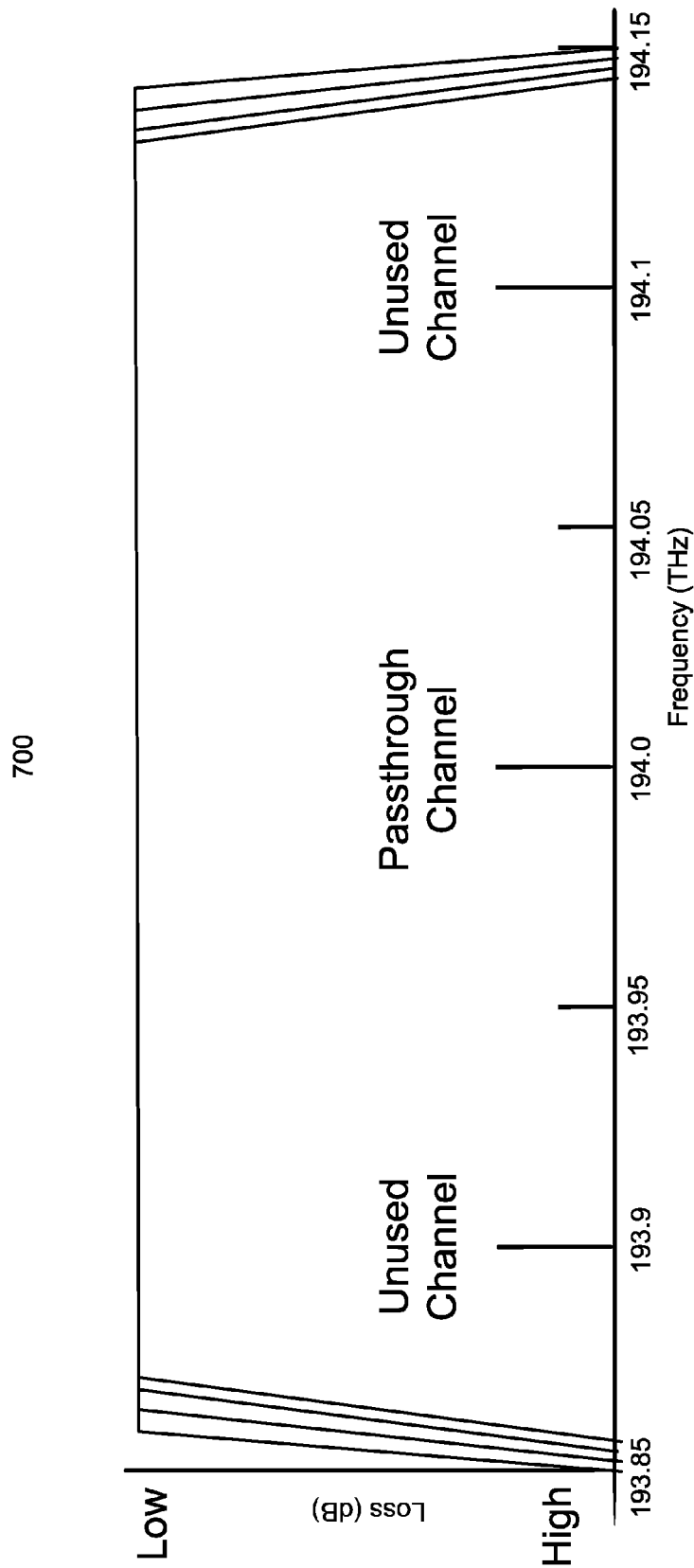
FIG. 7 is a graph illustrating the reduced bandwidth narrowing effects for the provisioning example in FIG. 6.

Graph 700 in FIG. 7 illustrates the passband of the WSS modules for the novel provisioning shown in FIG. 6. Since the unused adjacent channels are provisioned to the same physical state as is signal channel 194.0 (preferably including per-channel attenuation), the bandwidth narrowing occurs only on the edges of the adjacent channels, and the 194.0 signal channel does not experience spectral narrowing on its spectral edges as it propagates through the WSS modules.

This reduction of bandwidth narrowing depends on the usage of the adjacent channels. WSS bandwidth narrowing on a particular signal occurs only when an adjacent channel is present and blocked (and/or set at a significantly different value of attenuation), or configured along a different path through the WSS. Whenever an adjacent channel is blocked because it is not present, the bandwidth-narrowing penalty resulting from conventional methods can be eliminated by the present invention.

For WSS modules with a power control function where the unused adjacent channels are provisioned as disclosed herein, it is preferable that the unused adjacent channels be attenuated to the same levels as are the provisioned channels. Low-power alarms for the unused adjacent channels should also preferably be disabled.

In one embodiment, provisioning of channels using the newly introduced "PTA-N" state employs a hierarchy to appropriately provision the WSS when adjacent channels are activated. This hierarchy is illustrated using network 800 of FIG. 8, which shows the network of FIG. 3 when the additional Channel 193.9 is provisioned to be transmitted from Node 4 to Node 2 in the counterclockwise direction.

Table 900 in FIG. 9 illustrates the conventional provisioning (prior art) of the WSS modules for the example shown in FIG. 7. The provisioning of Channel 194.0 in column 910 is the same as in Table 400 in FIG. 4. Column 920 in FIG. 9 shows the state of each WSS module for the added Channel 193.9. The WSS at the Channel 193.9 transmitter node, Node 4, is set to pass the Channel 193.9 signal from the second input port (state "PT-2"), and the WSS at the intermediate nodes, Node 5, 6, 7, and 1 are set to pass the Channel 193.9 signal from the line input port to the line output port (state "PT-1"). The node that is dropping the signal, Node 2, is set to block Channel 193.9 (state "BD"); and Node 3, which is not in the added signal's path, is left in the blocking state ("B").

In this example of conventional provisioning shown in Table 900, the original channel, 194.0, still passes through 4 WSS modules that effect bandwidth narrowing on its spectral edges, as is apparent from a comparison of column 910 (for Channel 194.0) to both column 920 (for adjacent Channel 193.9) and column 930 (for adjacent Channel 194.1). With respect to the path of the signal on Channel 194.0, from Node 1 to Node 4, the adjacent channels have a different physical state than Channel 194.0 at 8 edges (2 edges in each of 4 WSS locations). In particular, at Node 1, signal Channel 194.0 has a different physical state ("add") from that of adjacent Channels 193.9 ("pass through") and 194.1 ("blocking"). At Nodes 2 and 3, signal Channel 194.0 has a different physical state ("pass through") from that of adjacent Channels 193.9 ("blocking," despite a different logical "BD" state) and 194.1 ("blocking"). Finally, at Node 4, signal Channel 194.0 has a different physical state ("pass through") from that of adjacent Channels 193.9 ("add") and 194.1 ("blocking").

Also, in this example of conventional provisioning shown in Table 900, the second channel, 193.9, passes through 5 WSS modules (in Nodes 4, 5, 6, 7 and 1) that effect bandwidth narrowing on its specral edges, as is apparent from a comparison of column 920 (for Channel 193.9) to both column 940 (for Channel 193.8) and column 910 (for Channel 194.0). Thus, in the conventional provisioning example of FIG. 9, the addition of Channel 193.9 does not change the bandwidth narrowing on Channel 194.0. Similarly, the addition of Channel 194.0 does not change the bandwidth narrowing on Channel 193.9.

Figure 8:
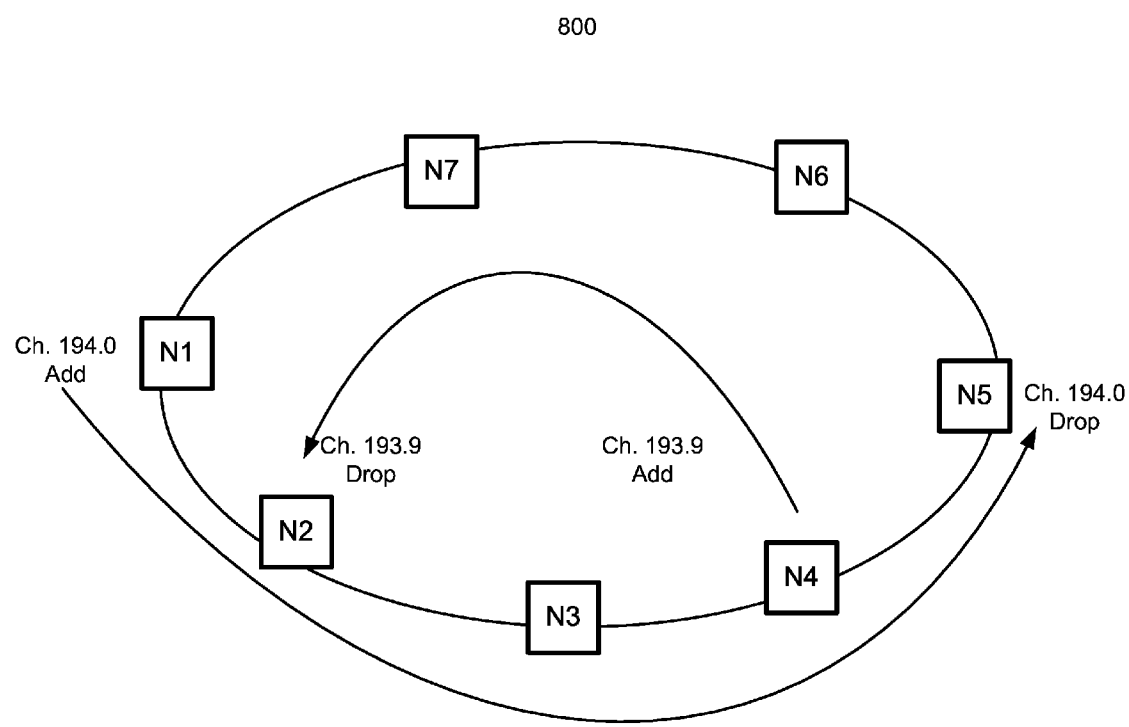
FIG. 8 illustrates the optical ring network of FIG. 3 for the case where channel 193.9 (193.9 THz) is transmitted from Node 4 to Node 2 in the counterclockwise direction.

Table 1000 in FIG. 10 illustrates a novel method of provisioning the WSS modules for the example shown in FIG. 8. The provisioning of Channel 194.0 in column 1010 is the same as in the previous example shown in FIG. 6. The provisioning of the added channel 193.9 has been modified in the same manner as described above at the nodes that add, drop, and passthrough the added channel 193.9, namely Nodes 4, 5, 6, 7, 1 and 2. Node 3, which is not in the added signal's path, is left in the previous "PTA-1" state.

Note that the new WSS states of "PT-1", "PT-2", and "BD" for Channel 193.9 that create the new signal path (shown in column 1030) overwrite the previous states (shown in FIG. 6) that created a path in this channel adjacent to Channel 194.0. Also note that creating the new path for channel 193.9 results in changes to the WSS states of the unused channel 193.8 (now shown in column 1040), which is provisioned as an unused channel adjacent to the new signal in Channel 193.9. Provisioning the new path for Channel 193.9 also affects the provisioning of adjacent Channel 194.0 at Nodes 6 and 7, which have their state changed from "B" to "PTA-1" so as to reduce the bandwidth narrowing on the Channel 193.9 signal.

Note, however, that the state of Channel 194.0 at the other nodes is not modified by the addition of the new signal at channel 193.9.

Thus, as a result of provisioning a new signal on Channel 193.9, the original signal on Channel 194.0 now experiences some bandwidth narrowing events (as illustrated by the 3 shaded entries in column 1030), but far fewer than the 8 bandwidth narrowing events shown in the conventional provisioning example of FIG. 9.

For example, with respect to Node 1, signal Channel 194.0 has a different physical state ("add") from that of adjacent Channel 193.9 ("pass through"), but the same physical state as adjacent Channel 194.1. Similarly, with respect to Nodes 2 and 4, signal Channel 194.0 has a different physical state ("pass through") from that of adjacent Channel 193.9 ("blocking" and "add," respectively), but the same physical state as adjacent Channel 194.1. And, with respect to Node 3, Channel 194.0 has the same physical state ("pass through") as both adjacent Channels 193.9 and 194.1. At the same time, in accordance with the present invention, the states of Channel 194.1 have changed in Nodes 1, 2, 3 and 4, the state of Channel 193.8 has changed in Node 3, and the states of Channel 193.8 have changed in Nodes 1, 4, 5, 6 and 7 (as compared to conventional provisioning shown in FIG. 9).

FIG. 11 illustrates one embodiment of a set of rules for changing the state of the WSS at each node when a signal is added. Note that these rules assume that the channel is being added at input port N (N>1), while input port 1 is used for the passthrough traffic from the line input port. These rules are based on a hierarchy of states as follows:

1) PT-N (Highest Priority)
2) BD
3) PTA-N
4) B (Lowest Priority)

State "PT-N" takes priority over all other states. For example, a channel that is set to the "BD" state that receives a "PT-N" request will switch to the "PT-N" state; whereas a channel that is set to the "PT-N" state that receives a "BD" request will remain in the "PT-N" state. This hierarchy gives priority to provisioned signals over provisioned unused passthrough channels that are adjacent to signal channels. Additionally, this hierarchy gives priority of provisioned unused passthrough channels that are adjacent to signal channels over unused channels without adjacent signals. More general rules can easily be derived by those skilled in the art.

With these simplified rules, each WSS can set the state of each channel given the same provisioning request as a current WSS. Furthermore, this new provisioning method supports a self-provisioning WSS based on channel powers as described in US Pat No 2010/0221004.

In one embodiment, for cases where a WSS is in state "PT-N" and a new provisioning request occurs for "PT-M" where N is not equal to M, the new provisioning request takes precedence. Similarly, where a conflict arises between "PTA-N" and "PTA-M" where N is not equal to M, the new provisioning request takes precedence. In other embodiments, the prior state is given precedence. Changing the configuration from "PT-N" to "PT-M" may affect traffic, so an optional warning to the network operator may be desired upon such a state change.

When a signal is removed from the network, the provisioning of the WSS can be adjusted using the state hierarchy described above. Where the state was "PT-N" or "BD," the state would revert to "PTA-N" where there are adjacent provisioned channels, and the state would revert to "B" where there are no adjacent provisioned channels.

The full WSS state table, of which subsets are shown in FIGS. 4, 6, 9 and 10, provides a single means of counting the number of bandwidth narrowing events with respect to each provisioned signal. For each channel, software can work from the point where a signal is added (state "PT-2" for the case of a degree-2 WSS) to the state where a channel is dropped (state "BD"). For each WSS along that path, there is a bandwidth narrowing event if the WSS of an adjacent channel is not in the same physical state as the signal channel (despite a difference in the logical state, such as a signal channel in state "PT-N" where adjacent channels are in state "PTA-N").

Therefore, the number of bandwidth narrowing events with respect to each channel (including both adjacent edges of each channel) can be calculated and reported, as well as used to minimize the number of bandwidth narrowing events when determining the channel to which a new client signal should be assigned. Furthermore, if there is a significant number of bandwidth narrowing events on one particular side of a signal, the bandwidth narrowing penalty of that signal can be reduced by slightly shifting the signal frequency to the other side of the central frequency.

Figure 12:
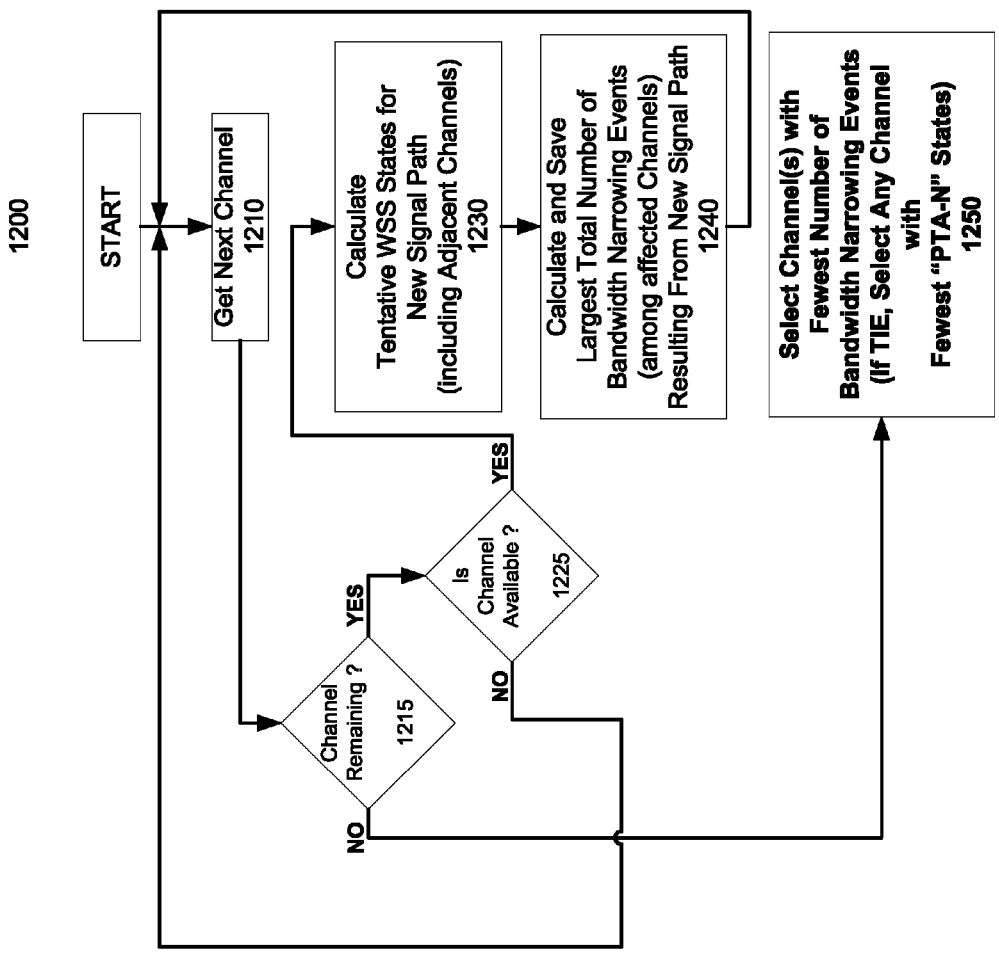
FIG. 12 is a flowchart illustrating one embodiment of an algorithm for selecting new channel frequencies so as to minimize bandwidth narrowing penalties.

In another embodiment, illustrated in FIG. 12, the WSS state table is used to select the channel (frequency/wavelength) to which a new client signal will be assigned for the purpose of minimizing bandwidth narrowing. When the network management software is alerted to a new signal request, the software can select the "ideal" channel in accordance with the following method:

Each channel is examined in turn, beginning with step 1210. If any channels remain (step 1215—YES), then the channel is examined in step 1225 to determine whether it is available along the requested path. If the channel at any node along the requested path is in a "PT-N" state (as distinguished from a "PTA-N" state), then the channel is unavailable, as it is already being used for a provisioned client signal. In that event (step 1225—NO), processing returns to step 1210 to examine the next channel.

If the channel is available (step 1225—YES), then processing proceeds to step 1230 to calculate the tentative new WSS state table for the new signal path (e.g., as shown in FIG. 11, and in column 1030 of FIG. 10 for Channel 193.9 Nodes 4, 5, 6, 7, 1 and 2). As shown in FIG. 11, adjacent channels must also be updated (as were columns 1040 and 1010 of FIG. 10 for respective adjacent channels 193.8 and 194.0).

Processing then proceeds to step 1240 to calculate the total number of bandwidth narrowing events for each affected channel in the tentative new WSS state table. This includes not only the tentatively provisioned channel, but also one or both of its adjacent channels if they are used in the network to transmit signals. For the tentatively provisioned channel (and its adjacent channels if they are used to transmit signals), the physical state of the channel at the source node, intermediate nodes and destination node is compared to the updated states of each of its adjacent channels at those nodes. In this embodiment, each difference in physical state (from each adjacent node) is considered a distinct bandwidth narrowing event.

The total number of bandwidth narrowing events for the tentatively provisioned channel is then compared to the total number of bandwidth narrowing events for each adjacent channel used to transmit signals, and the largest of these totals is saved. Note that we consider separately, on a per-channel basis, the total number of bandwidth narrowing events for each of these channels, rather than adding these totals together, because the worst-case penalty occurs on the channel with the most bandwidth narrowing events.

In other words, it is more important to reduce the maximum number of bandwidth narrowing events on the worst-case channel than to reduce the total number of bandwidth narrowing events across multiple channels or even the entire network. This is because bandwidth narrowing gets increasingly worse on a given channel as the number of bandwidth narrowing events increases (eventually leading to bit errors), but bandwidth narrowing on one channel does not affect bandwidth narrowing on other (particularly other non-adjacent) channels. For example, if bit errors began to appear after 7 bandwidth narrowing events occurred on a given channel, then it would be preferable to have 100 channels each with 5 bandwidth narrowing events than to have 98 channels each with 2 bandwidth narrowing events and 2 channels each with 10 bandwidth narrowing events.

The number of generated "PTA-N" states is also calculated, on a per-channel basis—to "break a tie" in the event that more than one tentatively-provisioned channel generates the same lowest number of bandwidth narrowing events. This information is also saved, and processing then returns to step 1210 to examine the next channel.

This process is repeated for each available channel, until no additional channels remain to be examined (step 1215—NO), at which point processing proceeds to step 1250 to determine which tentatively provisioned channel(s) (after taking their adjacent channels into account, as discussed above) would yield the fewest number of bandwidth narrowing events.

If more than one channel qualifies, then the channel that generates the fewest number of "PTA-N" states would be selected. If there still remains more than one such channel, then additional "tie-breaking" factors could be considered, including the random selection of one of those channels. These tie-breaking factors are, in one embodiment, designed to favor the use of adjacent channels along the same path. Otherwise, signals could be provisioned where no adjacent channels are in use, resulting in a coarse distribution of provisioned channels that could unduly restrict channel availability at high channel counts.

The algorithm illustrated in FIG. 12 is designed not only to minimize (as well as significantly reduce) the bandwidth narrowing effects on added channels, but to minimize the bandwidth narrowing effects of the added channels on the other signal channels (e.g., adjacent channels).

While there can be some concern regarding crosstalk that arises from using adjacent channels for signal connections between the same nodes, those skilled in the art will recognize that current drop filters have sufficient isolation to render such crosstalk negligible.

The present invention has been described herein with reference to specific embodiments as illustrated in the accompanying drawings. Although the WSS provisioning embodiments have been described for the case of a unidirectional connection through degree-2 WSS devices in a filtered add configuration, the same concepts may also be applied to bidirectional connections, through higher degree WSS devices, and in WSS devices in a filtered drop configuration or WSS configuration devices used for both adds and drops. It should be understood that, in light of the present disclosure, additional embodiments of the concepts disclosed herein may be envisioned and implemented within the scope of the present invention by those skilled in the art.

The invention claimed is:

1. A method for provisioning a channel on which a client signal will be transmitted along a path from a source node through at least one intermediate node before reaching a destination node of a WDM optical network, the method comprising the following steps:
(a) selecting a signal channel and a path on which the client signal will be transmitted among a plurality of nodes of the network;
(b) executing software on a CPU to configure an optical filter at each node along the path to reflect the state of the signal channel at that node;
(c) determining, with respect to each node along the path, whether each of two channels adjacent to the signal channel is unused; and
(d) configuring the optical filter at each node along the path by setting the state of each unused adjacent channel to the same physical state as that of the signal channel,
(e) thereby effectively increasing the spectral passband of the client signal.

2. The method of claim 1, wherein the physical state of the signal channel at the source node of the path is an "add" state, the physical state of the signal channel at each intermediate node of the path is a "pass through" state and the physical state of the signal channel at the destination node is a "blocking" state.

3. The method of claim 2, wherein every channel is initially set to a default "blocking" state.

4. The method of claim 1, wherein the state of each unused adjacent channel is set to a different logical state than that of the signal channel.

5. The method of claim 1, wherein the level of attenuation of each unused adjacent channel is set to the same level of attenuation as that of the signal channel.

6. The method of claim 1, wherein the optical filter at each node along the path is a wavelength selective switch.

7. A method for minimizing bandwidth narrowing while provisioning one of a plurality of available channels on which a client signal will be transmitted along a path from a source node through at least one intermediate node before reaching a destination node of a WDM optical network, the method comprising the following steps:
(a) for each available signal channel,
(i) executing software on a CPU to tentative configure an optical filter at each node along the path to reflect the state of the available signal channel;
(ii) executing software on a CPU to tentative configure the optical filter at each node along the path to set the state of each unused channel adjacent to the available signal channel to the same physical state as that of the available signal channel;
(iii) determining the tentative number of bandwidth narrowing events from the perspective of the available signal channel, wherein a distinct bandwidth narrowing event would result for each channel which is adjacent to the available signal channel at a node along the path, and which has a physical state that differs from the physical state of the signal channel;
(iv) repeating step (iii) from the perspective of each of the channels adjacent to the available signal channel that is being used to transmit signals; and
(v) selecting the larger of the tentative numbers of bandwidth narrowing events determined in steps (iii) and (iv);
(b) selecting the available signal channel that yielded the smallest number of bandwidth narrowing events selected in step (a) (v); and
(c) provisioning the selected signal channel to transmit the client signal along the path.

8. A method for minimizing bandwidth narrowing after provisioning one of a plurality of available channels on which a client signal will be transmitted along a path from a source node through at least one intermediate node before reaching a destination node of a WDM optical network, the method comprising the following steps:

(a) executing software on a CPU to calculate, for the provisioned signal channel, the number of existing bandwidth narrowing events with respect to each of the two channels adjacent to the provisioned signal channel, wherein a distinct bandwidth narrowing event occurs for each channel which is adjacent to the provisioned signal channel at a node along the path, and which has a physical state that differs from the physical state of the provisioned signal channel; and (b) shifting the frequency of the provisioned signal channel toward the frequency of the channel adjacent to the provisioned signal channel having the fewest number of bandwidth narrowing events, wherein the amount of the frequency shift is a function of the number of bandwidth narrowing events calculated with respect to each of the two channels adjacent to the provisioned signal channel.

* * * * *